4 Sheets—Sheet 3.
E. WOODBURY.
GRAIN-BINDER.
No. 174,886. Patented March 14, 1876.
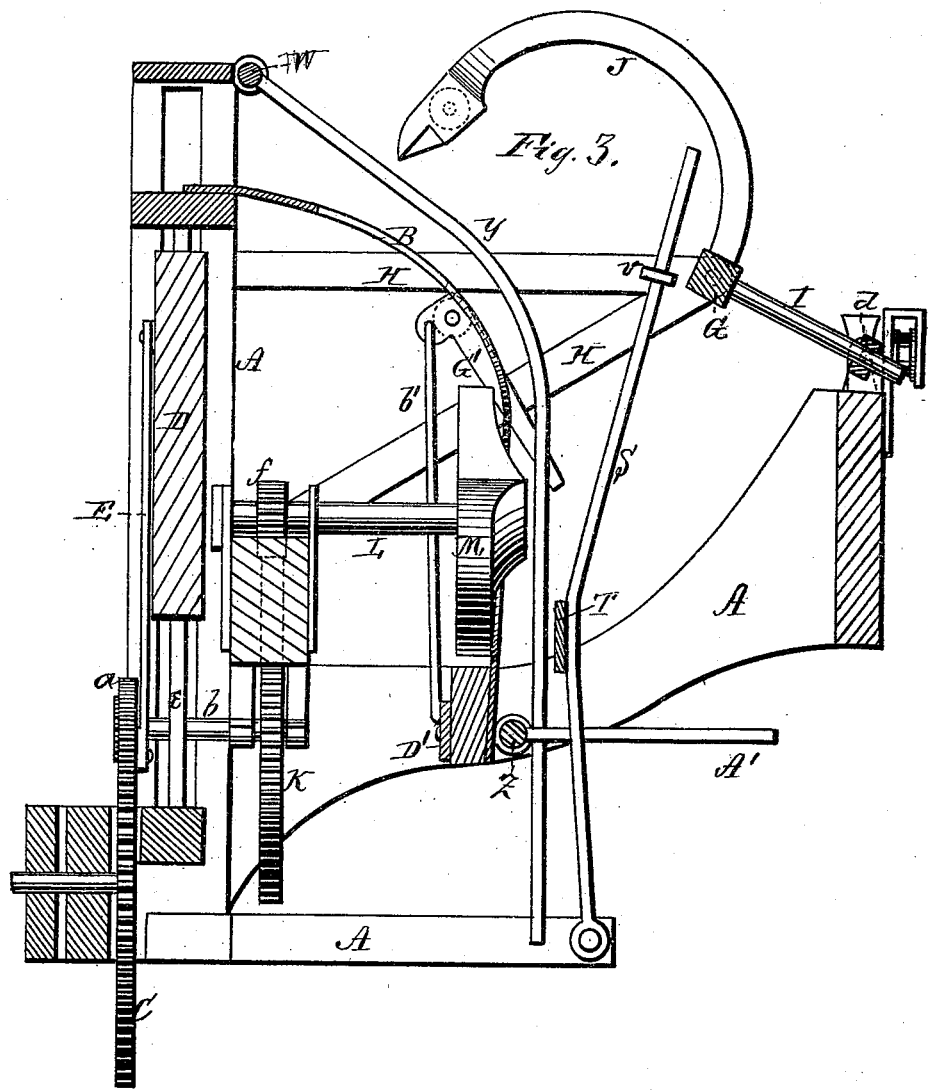
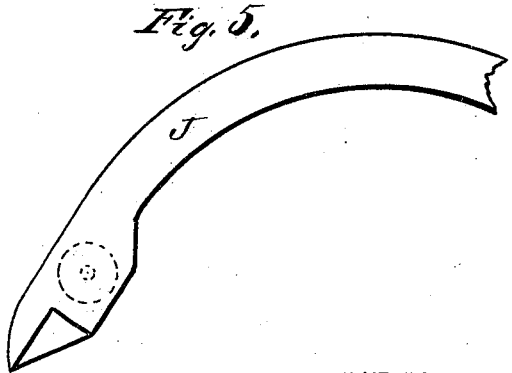
WITNESSES
INVENTOR,
Edward Woodbury,
Gilmore & Co.,
ATTORNEYS.

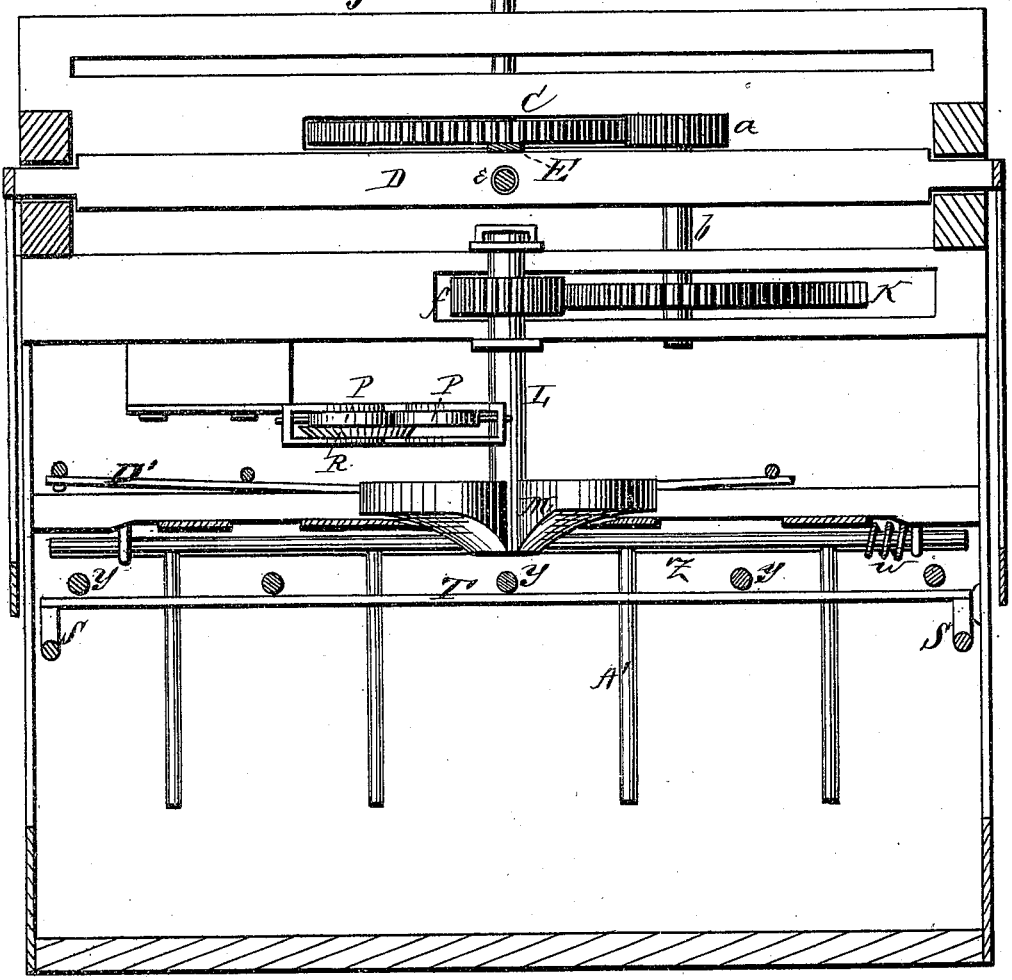

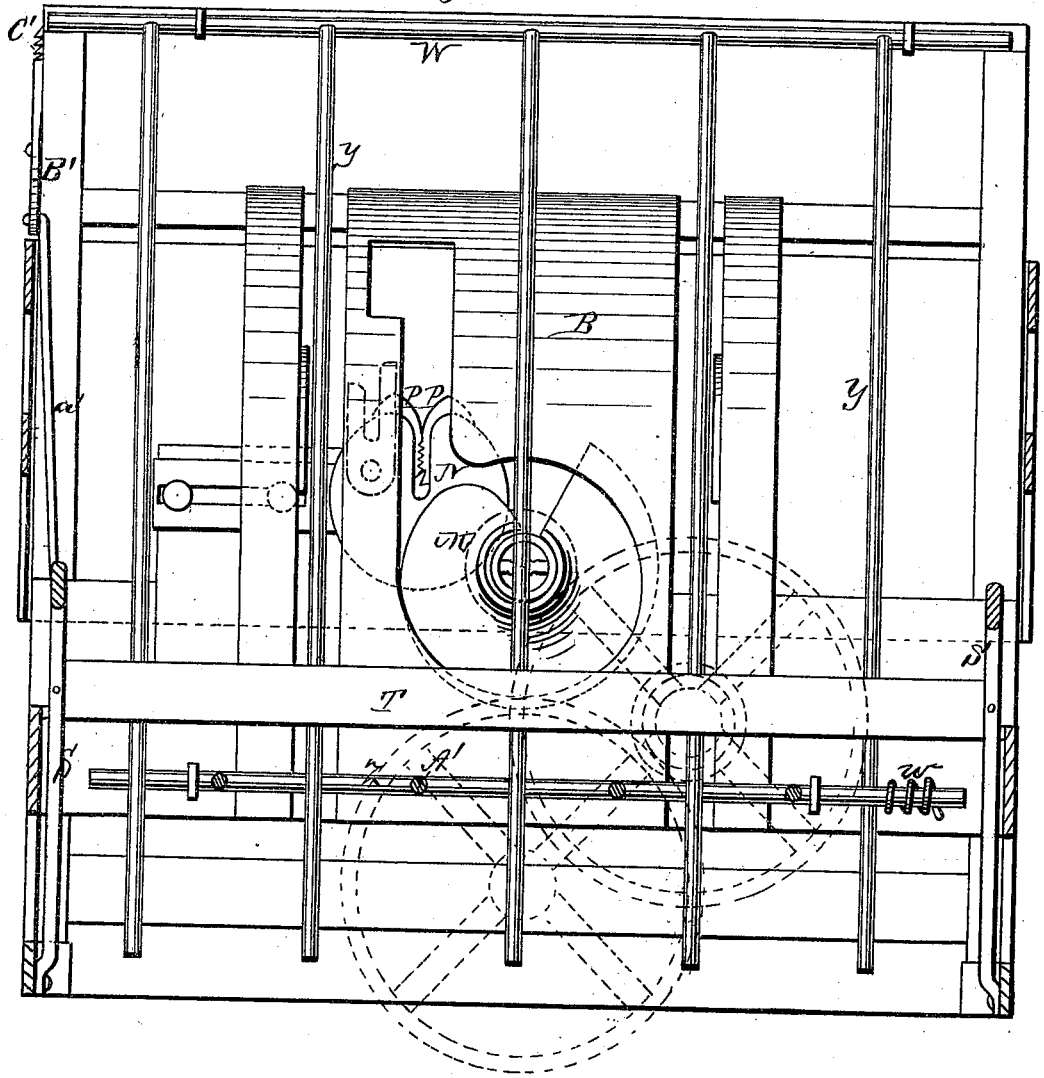

E. WOODBURY.
GRAIN-BINDER.
No. 174,886. Patented March 14, 1876.
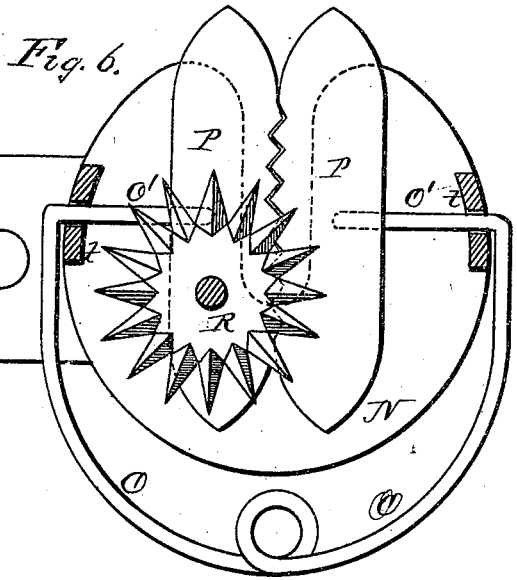
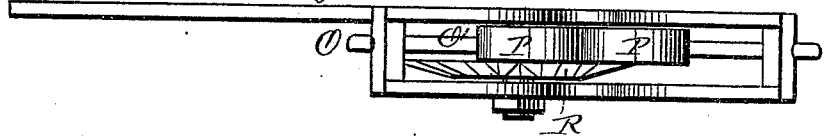
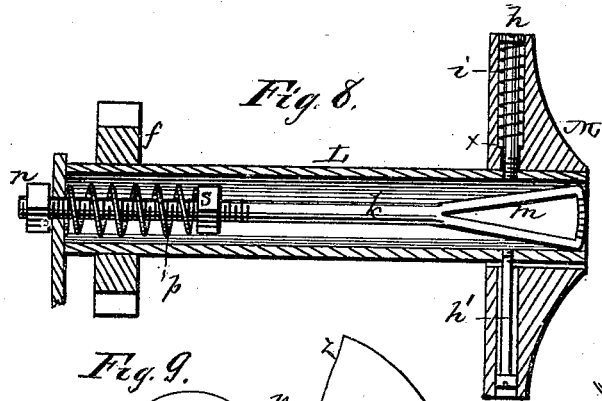
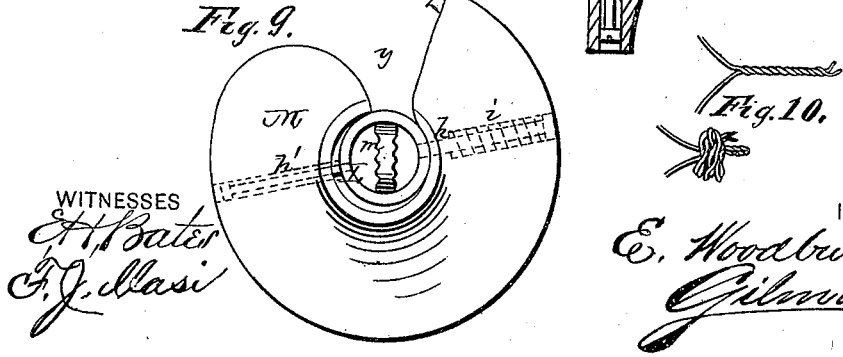

UNITED STATES PATENT OFFICE.

EDWARD WOODBURY, OF KALAMAZOO, MICHIGAN.

IMPROVEMENT IN GRAIN-BINDERS.

Specification forming part of Letters Patent No. 174,886, dated March 14, 1876; application filed January 15, 1876.

*To all whom it may concern:*

Be it known that I, EDWARD WOODBURY, of Kalamazoo, in the county of Kalamazoo and State of Michigan, have invented a new and valuable Improvement in Self-Binding Harvester; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my harvester, and Fig. 2 is a vertical sectional view of the same. Fig. 3 is a sectional detail view thereof, and Figs. 4, 5, 6, 7, 8, 9, and 10 are detail views.

The nature of my invention consists in the construction and arrangement of a grain-binding attachment for harvesters, as will be hereinafter more fully set forth.

In the annexed drawings, A represents a frame-work, of any suitable construction, to contain the various operating parts of my invention. This frame-work is to be attached to the frame of a harvester, in suitable position to receive the grain from the carrier or elevator of the harvester over a convex slotted guard, B, arranged in the upper part of the frame A, as shown in Fig. 2.

In the lower part of the frame A is a cog-wheel, C, which receives its motion direct from the harvester, and which meshes with a pinion, $a$, on a shaft, $b$.

On the side of the cog-wheel C is a crank or wrist-pin connected by a pitman, E, with a cross-head, D, moving vertically in guides in the frame A, and upon a vertical rod, $e$, fast in said frame.

To each end of the cross-head D is secured a triangular brace, H, in the outer ends of which is placed a rocking shaft or bar, G. From the center of this rocking-shaft projects the curved cord-arm J, and also a straight arm or rod, I, which latter passes through a swiveled guide, $d$, pivoted in suitable ears on the outer part of the frame A.

On the shaft $b$, above mentioned, is secured a cog-wheel, $k$, which meshes with a pinion, $f$, fast on a tube, L, having its bearings in suitable plates or bars in the main frame. On the outer or front end of this tube is placed the twister-head M, held thereto on one side by means of a long screw, $h'$, passing through a radial hole in the head and screwing into the tube. And on the opposite side of the head is a similar hole, through which another long screw, $h$, is passed and screwed into the head, this latter hole, however, being formed near its inner end with a shoulder, $x$, and a spiral spring, $i$, placed around the screw between the head thereof and said shoulder $x$. The outer face of the head M is made convex or conical, and projects through the curved guard B.

In one side of the head M is made an opening, $y$, the head on one side thereof being rounded, and the other side straight, and forming, as it were, a hook, $z$. It will readily be seen that, by turning the screw $h$, the tension of the spring $i$ is readily regulated.

Through the center of the tube L is passed a rod, $k$, the outer end of which forms a triangular loop, $m$, and the inner end passed through the rear bearing-plate of the tube L. The rod $k$ is held to said plate by a nut, $n$, on the end of the rod, and a spring, $p$, surrounding on the other side of the plate, the tension of the spring being regulated by a nut, $s$, on the rod. The rod $k$ is adjusted so that the end of the loop $m$ will be flush, or nearly flush, with the outer face of the center of the twister-head M.

Above and a little to one side of the twister-head M is secured a centrally-slotted plate, N, to which is connected a spring, O. This spring is coiled in the center, and its two arms curved upward, as shown, after which the arms are bent horizontally inward and passed through ears $t\ t$ on the plate N. On each of these arms, which are marked O', is hung a jaw, P. The ends of these jaws are made rounded, as shown, and their adjoining edges are toothed or corrugated to take into each other, and they are hung in the center by having the ends O' of the spring entering holes in their outer edges.

On a stud projecting from the plate N is pivoted a many-armed revolving cutter, R, the arms or prongs of which are pointed and sharpened on their rear edges.

On the inner side of each triangular brace H, near the outer end, projects a perforated ear, $v$, through which passes a bent rod, S, having its lower end pivoted to an arm projecting from the frame A, and to the two rods S S is secured a horizontal bar, T.

At the upper end of the frame A, on the outer side, is a rock-shaft, W, from which project a series of curved arms or rods, Y, to hold the grain to the curved guard B. In the outer lower portions of the frame A is a similar rock-shaft, Z, with straight arms A', held in a horizontal position by means of springs $w$. On one end of the frame A is pivoted a lever, B', the inner end of which may be held at any point desired by a rack-bar, C', and the outer end connected by a rod, $a'$, with one end of a lever, D'. This lever is by rods $b'$ $b'$ connected with fingers G' G' pivoted one at each side of the curved and slotted guard B. The connecting-rods $b'$ are arranged one on each side of the pivot of the lever D', so that when one finger is thrown out the other is thrown in, and vice versa.

The operation of my machine is substantially as follows: The machine being in motion the cross-head D is moved vertically up and down, and the twister-head M rotated continuously. The wire or binding material used in binding is on a spool placed on a rod in a suitable part of the frame A, and the wire or binding material passed around one or more pulleys over a pulley arranged in a slot in the end of the wire arm J and the end of the wire or binding material held between the jaws P P. The grain passing over the guard B is held thereto by the arms Y, the wire or binding material preventing it from falling all the way down. Now, as the cross-head D descends the rocking shaft H also descends, and is at the same time turned in its bearings by the rod I and pivoted guide $d$, so as to throw the wire arm J over the bundle of grain, bringing the wire or binding material with it over the grain. This movement of the cross-head also moves the bar T outward, so as to give room for the bundle to fall down. The forward and downward movement of the wire arm brings the wire or binding material carried by said arm in between the jaws P P until it comes in contact with one of the arms of the cutter R, and, being pulled down, is cut off, and at the same time the cutter is revolved sufficiently by the wire or binding material operating on it to set the next arm in position. The twister M, by its hook $z$, catches the ends of the wire or binding material, which move through the slot or opening Y, and in between the hub of the head M and the tube L, the spring $i$ on the screw $h$ giving sufficient tension to hold the ends of the wire or binding material there. The wire or binding material is then twisted by the revolving twister—the central rod $k$ remaining stationary—until a kink is formed in the twist, which kink is by the bundle pressed into the end of the tube L and caught by the loop $m$ on the end of the rod $k$.

In binding the bundle the center is, of course, the smallest, and if the face of the twister were straight the center of the head would not touch the bundle; but the head being made convex or conical it just fits against the bundle, thus causing the kink in the twisted wire or binding material to be pressed into the end of the tube L, and be caught by the loop $m$. This causes the rod $k$ to rotate slowly in its bearings, and draw the ends of the wire or binding material out from the twister, while the twister at the same time continues to wind the wire or binding material around the kink, thus forming a perfect and tight knot. As soon as the ends of the wire or binding material are released from the twister the kink is disengaged from the loop $m$, and the bundle falls down to the ground in the usual manner. The knot in the wire or binding material may be made hard or loose, as desired, by simply regulating the tension of the spring $p$ on the rod $k$ so as to increase or diminish the friction, and consequently cause the rod to revolve harder or easier. As the cross-head D ascends again the wire arm J is thrown upward, and at the same time the bar T is moved inward sufficiently to form, as it were, a stop for the movement of the arms Y, so that the grain will be held preparatory to forming a bundle.

With the grain-binding attachments now generally in use it is necessary to adjust them according to the length of the grain, for which purpose they are generally set in guides and movable therein. With my invention this is obviated, and the binder is permanently attached to the harvester in one fixed position, and to regulate the position of the band on the bundle I employ the fingers G' G', as above described, whereby the grain is tilted to either side, and the position of the wire or binding material on the grain changed accordingly, thus adjusting it for either long or short grain.

Having thus fully described my invention, what I claim as new, and desire to secure by Letters Patent, is—

1. In a grain-binder, the combination, with the vertically-operating cross-head D and braces H H attached thereto, of the rocking shaft G, wire arm J, straight rod I, and swiveled or pivoted guide $d$, substantially as and for the purposes herein set forth.

2. The pivoted and bent rods S S, and the cross-bar T attached thereto, in combination with the braces H H and perforated ears $v$ $v$ projecting therefrom, substantially as and for the purposes herein set forth.

3. The toothed or corrugated jaws P P, hung centrally upon the ends of a wire spring, O, substantially as and for the purposes herein set forth.

4. The toothed or star-shaped cutter R, in combination with the centrally-hung jaws P P, and spring O, as and for the purposes herein set forth.

5. The rotating twister M, constructed with convex or conical face, slot or opening $y$, screws $h\ h'$, spring $i$, and hook $z$, as and for the purposes herein set forth.

6. The combination of the rotating tube L, twister-head M, screws $h\ h'$, and spring $i$, all substantially as and for the purpose therein set forth.

7. The rod K, with loops $m$, nuts $n\ s$, and spring $p$, in combination with the tube L and head M, all constructed substantially as and for the purpose herein set forth.

In testimony that I claim the above I have hereunto subscribed my name in the presence of two witnesses.

EDWARD WOODBURY.

Witnesses:
　WM. A. WOOD,
　E. J. PHELPS.